United States Patent [19]

Minami

[11] 4,295,045
[45] Oct. 13, 1981

[54] BACKGROUND COMPENSATION TYPE PLUTONIUM AIR MONITOR

[75] Inventor: Kentaro Minami, Oaraimachi, Japan

[73] Assignee: Japan Atomic Energy Research Institute, Tokyo, Japan

[21] Appl. No.: 138,406

[22] Filed: Apr. 8, 1980

[30] Foreign Application Priority Data

Apr. 28, 1979 [JP] Japan ................................ 54-52030

[51] Int. Cl.³ ........................... G01V 5/00; G01T 1/18
[52] U.S. Cl. ...................................... 250/255; 250/380
[58] Field of Search ............... 250/252, 253, 255, 380

[56] References Cited

U.S. PATENT DOCUMENTS 2,957,084 10/1960 Marr et al. .......................... 250/380
4,078,178 3/1978 Lowes ................................. 250/252

Primary Examiner—Alfred E. Smith
Assistant Examiner—Janice A. Howell
Attorney, Agent, or Firm—Oblon, Fisher, Spivak, McClelland & Maier

[57] ABSTRACT

The background counting rate of a plutonium measuring channel which is caused by the partial transition of α-ray energy spectrum of the daughter nuclides of the radon and the thoron to low energy side has relationship with the counting rate due to the daughter nuclide of the radon and the thoron which have energy exceeding 5.5 MeV. The background counting rate of the plutonium measuring channel is erased digitally by using the above mentioned relationship in a plutonium air monitor.

2 Claims, 3 Drawing Figures

BACKGROUND COMPENSATION TYPE PLUTONIUM AIR MONITOR

BACKGROUND OF THE INVENTION

This invention relates to a background compensating type plutonium air monitor and, more particularly, to a plutonium air monitor in which the background counting rate of a plutonium measuring channel is erased digitally by using relationship in measuring the permissible concentration of the plutonium wherein the background counting rate of a plutonium measuring channel which is caused by the partial transition of α-ray energy spectrum of the daughter nuclides of the radon and the thoron to low energy side has relationship with the counting rate due to the daughter nuclide of the radon and the thoron which have energy exceeding 5.5 MeV.

The air pollution due to the plutonium dust is extremely harmful to the human body and, accordingly, the maximum permissible concentration of the plutonium dust in a working environment is legally determined at an extreme low concentration, such as $2 \times 10^{-12} \mu Ci/cm^3$. Daughter nuclides of natural radon and thoron ordinarily exist in the atmosphere making the substantial part the radon and its daughter nuclide. The concentration of the radioactivity of the daughter nuclides depends on the condition of the atmosphere and varies in a range from $10^{-9}$ to $10^{-12} \mu Ci/cm^3$ to emit α-rays as the plutonium does. Therefore, when the permissible concentration of the plutonium is measured by a fixed filterpaper type dust monitor under a condition where the daughter nuclides stated above exist, the background affection due to natural radionuclides such as the radon and the thoron daughter must be removed.

The α-ray energy emitted from the daughter nuclide of the radon and the thoron which has 6~9 MeV is fortunately different from that emitted from the plutonium which has 5.2 MeV. Therefore, a plutonium air monitor having relatively less background counting can be obtained if the permissible concentration of the plutonium is measured by setting the plutonium measuring channel in the neighbourhood of 5.2 MeV by means of a detector having better energy resolving power and a single channel analyzer. However, even with the measurement stated above, some background counting remains in the plutonium measuring channel due to the transition of the α-ray spectrum of the daughter nuclides of the radon and the thoron which are collected on the filter-paper and, further, the background counting varies with the variation in the concentration of the daughter nuclides of the radon and the thoron to affect remarkably the measurement of the low-concentration plutonium.

The fundamental circuit of a background compensating type plutonium air monitor of the prior art is shown in FIG. 1. In the FIGURE, the radio dust collected in a filter-paper 1 is converted into electrical signals by means of a detector 2 and the signals are amplified by means of an amplifier 3. The output from amplifier 3 is applied to a single channel analyzer which is comprised of an upper-level discriminator 4, a lower-lower level discriminator 5 and an anti-coincidence gate circuit 6. According to the background compensating system of the plutonium air monitor of the prior art, the counting rate of the daughter nuclide of the radon and the thoron exceeding 5.5 MeV coming from upper-level discriminator 4 is applied to a linear-rate meter f and the counting rate of the plutonium measuring channel coming from lower-level discriminator 5 and anti-coincidence gate circuit 6 is applied to a linear-rate meter g. Thus, random pulse signals are once applied to the linear-rate meter to be converted to a direct current output and, thereafter, a weight corresponding to the reciprocal of a relation function a is applied to the output of linear-rate meter f by means of a variable resistor h to obtain a direct current output equivalent to the background of the plutonium measuring channel. Finally, the output from variable resistor h and the output from linear-rate meter g are applied to a differential amplifier i to erase the background of the plutonium measuring channel.

The difficulty of the background compensation system of the prior art is in that the change-over of the measuring ranges is highly troublesome due to the simultaneous changeover of two sets of linear-rate meters and in that the adjustment of the whole system is not easy due to the long time-constant of the linear-rate meters. Therefore, it is desirable that the permissible concentration can be measured by means of a log-rate meter when the radiation is controlled by means of an air monitor. A system is indeed found in the market in which no change-over of the measuring range is needed in the compensation system of the prior art but the result is given in that the detecting sensitivity and the indicating precision become worse and an ability is insufficiently obtained in order to control the air pollution.

As stated above, the background compensating technique of the plutonium air monitor of the prior art depends on a linear-rate meter and a differential amplifier and uses a number of parts so that there remain difficulties in the measuring range change-over and control and the detecting sensitivity.

SUMMARY OF THE INVENTION

In the present invention, an arbitrary frequency divider of random pulse signals is combined with an automatic erasing circuit for background counting and the pulse signals is applied to a rate meter after the background of a plutonium measuring channel is erased with reference to each pulse. Thus, a log-rate meter can be used to measure the plutonium and the adjustment of the system can easily be effected digitally so that the detecting sensitivity will be improved.

The object of the present invention is to provide a plutonium air monitor in which the difficulties of the prior art stated above is resolved.

DESCRIPTION OF THE PREFERRED EMBODIMENT

Figure 1:
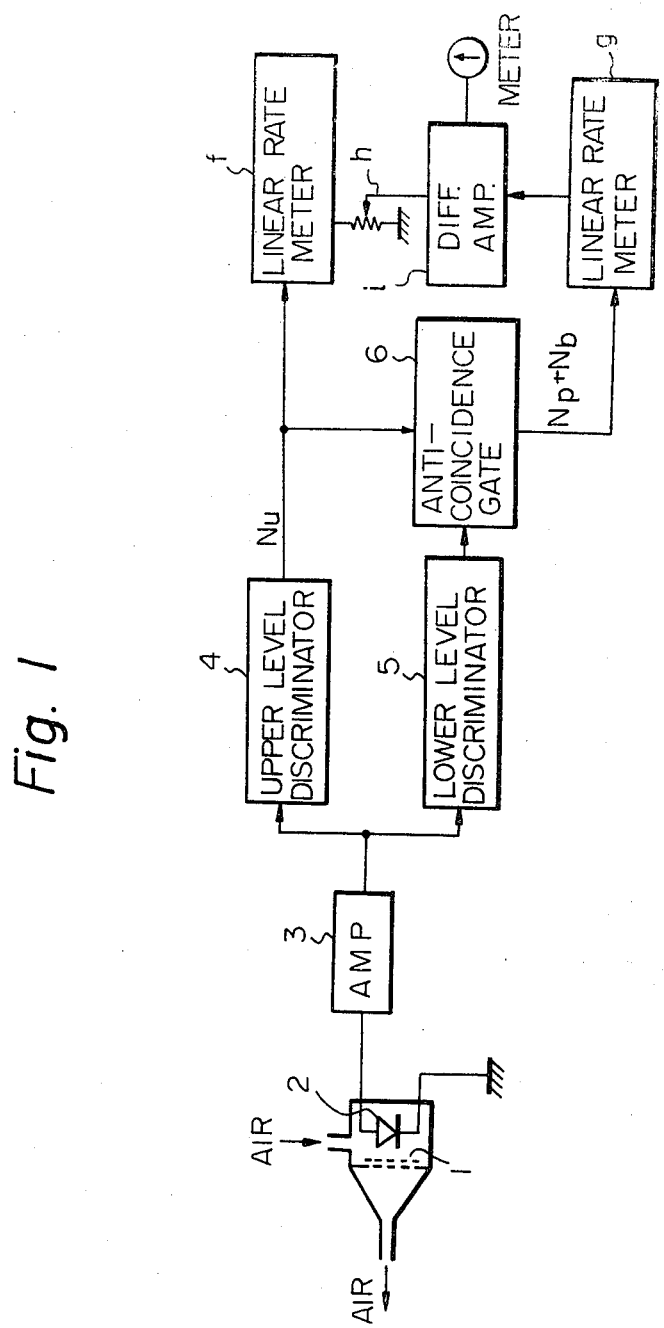
FIG. 1 shows a fundamental circuit of a background compensating type plutonium air monitor of the prior art.
Figure 2:
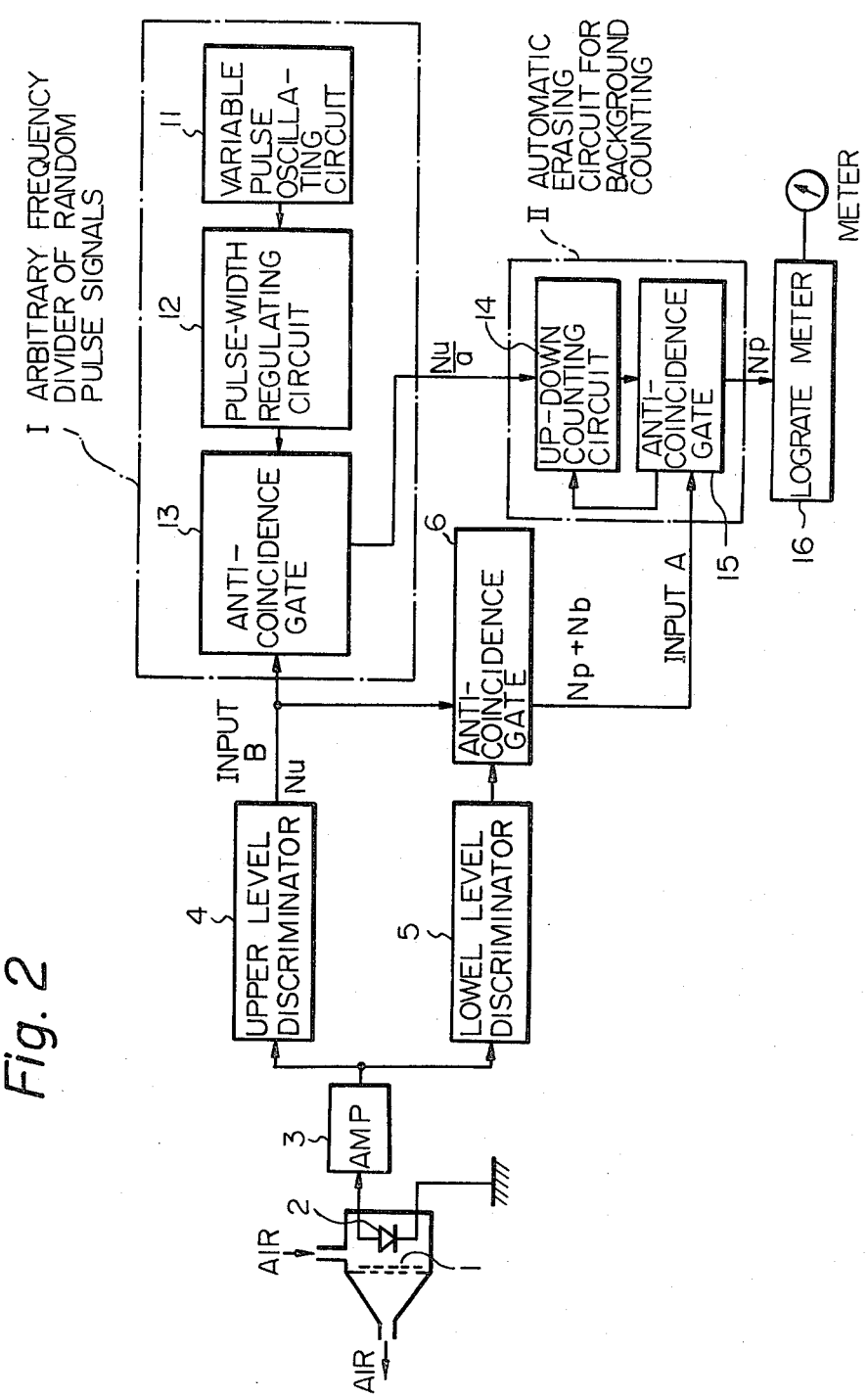
FIG. 2 shows an embodiment of the circuit construction of the plutonium air monitor of the present invention.

In FIG. 2, a background compensating circuit is constructed by an arbitrary frequency divider I of random pulse signals and an automatic erasing circuit II for background counting, the arbitrary frequency divider I being constructed by a variable pulse oscillating circuit 11, a pulse-width regulating circuit 12 and an anti-coincidence gate circuit 13 and the automatic erasing circuit II being constructed by a up-down counting circuit 14 and another anti-coincidence gate circuit 15. The measured values are indicated by a log-rate meter 16.

The construction of the plutonium air monitor shown in FIG. 2 is explained as follows:

The radio dust collected in a filter-paper 1 is converted into electrical signals by means of a detector 2 and the signals are emplified by means of an amplifier 3. The output from amplifier 3 is applied to a single channel analyzer which is comprised of an upper-level discriminator 4 and a lower-level discriminator 5.

The output from upper-level discriminator 4 is connected to anti-coincidence gate circuit 13 of arbitrary frequency divider I as an input B and the output from variable pulse oscillating circuit 11 is also connected to anti-coincidence gate circuit 13 through pulse-width regulating circuit 12. The output from anti-coincidence gate circuit 13 is connected to up-down counting circuit 14 of automatic erasing circuit II as an input C.

The output from lower-level discriminator 5 is connected to anti-coincidence gate circuit 15 of automatic erasing circuit II as an input A through an anti-coincidence gate circuit 6. The output from up-down counting circuit 14 is also connected to anti-coincidence gate circuit 15 and the output from anti-coincidence gate circuit 15 is connected to log-rate meter 16.

The operation of the plutonium air monitor shown in FIG. 2 is explained as follows:

The channel coming through lower-level discriminator 5 and anti-coincidence gate 6 is the plutonium measuring channel and from this channel is obtained a combination of the plutonium counting rate Np and the background counting rate Nb, the background counting rate Nb being originated from the transition of the $\alpha$-ray energy of the daughter nuclides of the radon and the thoron. The channel coming through upper-level discriminator 4 provides the counting rate Nu having energy exceeding 5.5 MeV of the daughter nuclides of the radon and the thoron.

The counting rate Nu is given by a product of the background counting rate Nb and a correlation coefficient a. Therefore, it is found that the signals for erasing the background counting rate Nb which is obtained from the plutonium measuring channel is obtainable by frequency-dividing the counting rate Nu by a factor of 1/a. It is necessary to provide a frequency divider in which the counting rate which is random pulses is arbitrarily frequency-divided and the background counting rate Nb is obtained from the arbitrary frequency divider I.

The counting rate Nu which is based on the signals applied to the input B is frequency-divide in the arbitrary frequency divider I and becomes background counting rate Nb which is Nu/a which is equivalent to the background of the plutonium measuring channel. This counting rate Nb is added to the automatic erasing circuit II as the input C and the counting rate Nb and the counting rate Np+Nb which is based on the signals coming from the plutonium measuring channel which is added to the input A, in the automatic erasing circuit II and it is concluded that the background counting rate Nb from the input A is automatically erased. Thus, the plutonium counting rate Np which is based on the signals due to the plutonium is only obtained as the output of the automatic erasing circuit II and added to log-rate meter 16 to indicate the plutonium.

As stated above, the plutonium air monitor of the present invention can detect the plutonium with high sensitivity even when the concentration of the daughter nuclides of the radon and the thoron vary extremely, by means of the automatic erasure of the background counting rate Nb and, moreover, a log-rate meter which could not be used in a plutonium air monitor of the background compensation type of the prior art can be used easily in the present invention. This is extremely convenient in controlling the air pollution and also the system is easily regulated.

Figure 3:
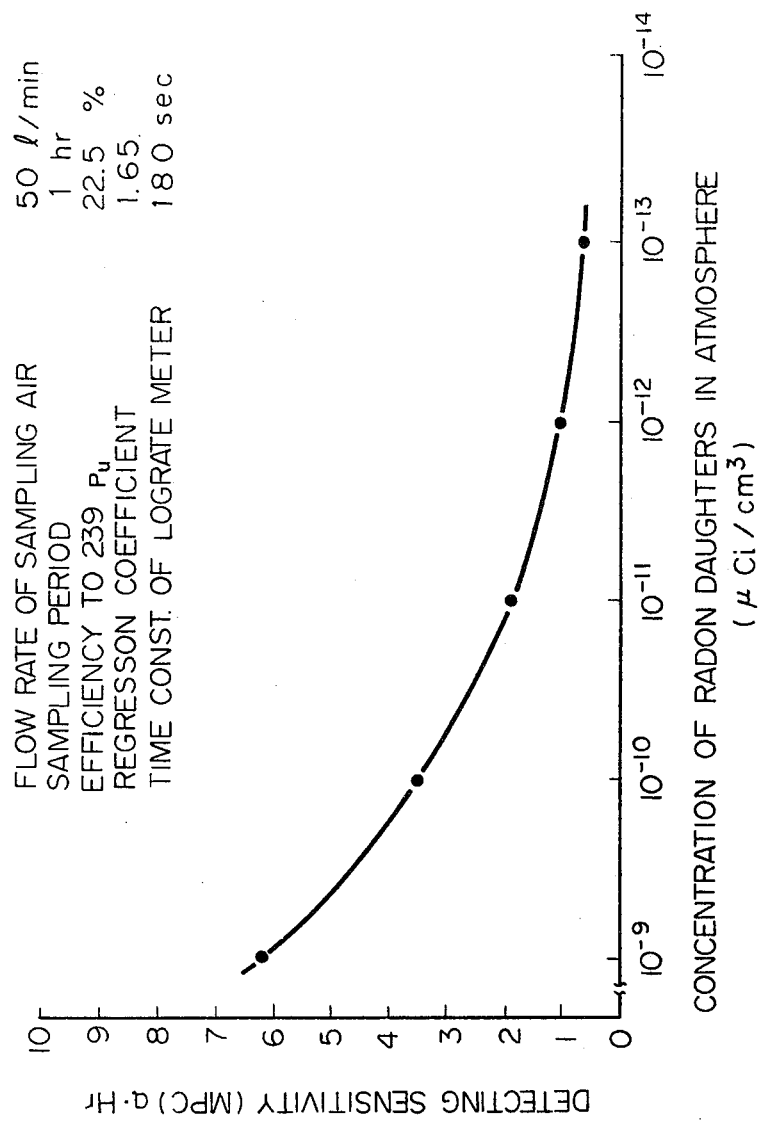
FIG. 3 shows an experimental example of the detecting sensitivity of the plutonium air monitor of the present invention.

An example of the experiment of the present invention is explained with reference to FIG. 3. The experiment is conducted by a dust collecting system of fixed filter-paper type using the background compensating type plutonium air monitor with a semiconductor detector of effective detecting area of 450 mm$^2$. The detecting sensitivity obtained after 1 hour operation of the dust collecting system is shown in FIG. 3. The ordinate indicates the plutonium detecting sensitivity which is the ratio of the plutonium detecting concentration to the maximum plutonium permissible concentration. The abscissa indicates the concentration of the daughter nuclide of the radon in the air. FIG. 3 explains that the background compensation of the plutonium air monitor of the present invention is achieved in better degree so that the plutonium can be detected with high sensitivity even with a remarkable variation of the concentration of the daughter nuclide of the radon.

The effectiveness of the background compensation type plutonium air monitor is enumerated in the following: a. the background of the plutonium measuring channel can digitally be erased on line, b. as the result of the erasure, a log-rate meter can be used with the plutonium air monitor of the present invention and the difficulty in changing-over the measuring scope can be solved, c. the manufacture and the regulation of the system are easy and the operation is stable as the erasure of the background is digitally effected, and d. the air pollution due to the plutonium can be detected with high sensitivity even with an extreme variation in the concentration of the daughter nuclide of the radon, and etc.

I claim:

1. A background compensating plutonium air monitor comprising:
    a detector for producing electrical signals in response to the incidence of radiation;
    an upper level discriminator and a lower level discriminator, each responsive to said electrical signals and each having an output, wherein the output of the upper level discriminator has a higher rate than the output of the lower level discriminator;
    an anti-coincidence gate connected to the output of both the upper level discriminator and the lower level discriminator and having an output;
    an arbitrary freqency divider for frequency dividing signals from the upper level discriminator and having an output; and
    an automatic erasing circuit connected to the output of said anti-coincidence gate and the output of said arbitrary frequency divider wherein the signals from the output of the arbitrary frequency divider are combined with the signals from the output of the anti-coincident circuit so as to erase background signals from the output of the anti-coincidence gate.

2. A background compensating plutonium air monitor specified in claim 1, further characterized in that the arbitrary frequency divider comprises a variable pulse oscillating circuit, a pulse-width controlling circuit and a second anti-coincidence gate circuit and the automatic erasing circuit comprises an up-down counting circuit and a third anti-coincidence gate circuit.

* * * * *